(12) United States Patent
Iizuka et al.

(10) Patent No.: US 7,527,339 B2
(45) Date of Patent: May 5, 2009

(54) BRAKE CONTROL SYSTEM FOR A MOTOR VEHICLE

(75) Inventors: Isamu Iizuka, Kanagawa (JP);
Motohiro Higuma, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 165 days.

(21) Appl. No.: 11/218,555

(22) Filed: Sep. 6, 2005

(65) Prior Publication Data
US 2006/0049687 A1 Mar. 9, 2006

(30) Foreign Application Priority Data
Sep. 6, 2004 (JP) ............................. 2004-258868

(51) Int. Cl.
*B60T 13/18* (2006.01)
(52) U.S. Cl. ........................................ 303/11; 303/9.62
(58) Field of Classification Search ................... 303/11, 303/9.62, 191
See application file for complete search history.

(56) References Cited
U.S. PATENT DOCUMENTS

| | | | | |
|---|---|---|---|---|
| 5,335,981 A | * | 8/1994 | Volz et al. ................. | 303/113.2 |
| 5,735,585 A | * | 4/1998 | Koike et al. ................. | 303/145 |
| 5,788,342 A | * | 8/1998 | Noguchi ................... | 303/116.2 |
| 5,918,948 A | * | 7/1999 | Burgdorf et al. .......... | 303/113.2 |
| 5,931,546 A | * | 8/1999 | Nakashima et al. ......... | 303/146 |
| 6,219,610 B1 | * | 4/2001 | Araki ........................... | 701/72 |
| 6,276,766 B1 | * | 8/2001 | Yamada ...................... | 303/154 |
| 6,390,568 B1 | * | 5/2002 | Tozu et al. ................ | 303/114.3 |
| 6,481,805 B1 | * | 11/2002 | Ichinose et al. ................ | 303/11 |
| 6,957,873 B2 | * | 10/2005 | Wanke et al. ................ | 303/140 |
| 7,137,673 B2 | * | 11/2006 | Anwar ......................... | 303/146 |

* cited by examiner

*Primary Examiner*—Robert A Siconolfi
*Assistant Examiner*—James K Hsiao
(74) *Attorney, Agent, or Firm*—Antonelli, Terry, Stout & Kraus, LLP.

(57) ABSTRACT

A brake control system for a motor vehicle comprising a brake control unit which controls increasing and decreasing of a brake pressure of a wheel cylinder from a pressure source by driving plural solenoid valves without a brake operation by a driver. The system comprises a flow back control unit which controls the brake pressure of a wheel cylinder to drive the plural solenoid valves before control by the brake control unit and returns the brake fluid to the pressure source from the wheel cylinder.

18 Claims, 5 Drawing Sheets

WITHOUT PRESSURIZATION MANAGEMENT

WITH PRESSURIZATION MANAGEMENT

BRAKE CONTROL SYSTEM FOR A MOTOR VEHICLE

BACKGROUND OF THE INVENTION

The present invention relates to a brake control system for a motor vehicle, and more particularly, to a control system for a plurality of brake circuits for a motor vehicle.

A brake control system for a motor vehicle is disclosed in JP-A-11-291879. There, a plurality of wheel cylinders is controlled and under certain conditions of use wheel cylinders may require a fast response, and a high pressure must be applied by the braking control system. Other wheel cylinders may only require small amount of pressure at that time.

However, the clearance between a brake pad and brake rotor varies for each wheel. An unnecessary brake force is applied to the wheel that has a narrow clearance. On the other hand, a response for a wheel having a wide clearance is delayed. As a result, there is a possibility that an error may occur in the brake control.

SUMMARY OF THE INVENTION

It is an object of the present invention to provide a brake control system for a motor vehicle, configured to ensure a stable vehicle control system with hydraulic braking system interaction, even when there are undesired fluctuations in pad-to-rotor clearances of a plurality of road wheels.

To achieve the above object, according to an aspect of the present invention, there is provided a brake control system for a motor vehicle, that comprises a brake control unit which controls increasing and decreasing of the brake pressure of a wheel cylinder from a pressure source by driving plural solenoid valves without operation of a brake operation by a driver, a flow back control unit which controls the brake pressure of the wheel cylinder to drive the plural solenoid valves before control by the brake control unit and return the brake pressure to the pressure source from the wheel cylinder.

According to another aspect of the present invention, there is a brake control system for a motor vehicle that comprises a wheel cylinder which is provided to a wheel, a brake pressure source which generates a brake pressure, a brake pressure circuit which connects the brake pressure source and the wheel cylinder, plural solenoid valves which are provided in the brake pressure circuit, a brake control unit which adjusts increasing and decreasing of a brake pressure of a wheel cylinder from the brake pressure source by driving plural solenoid valves without a brake operation by a driver, and a brake control unit that controls the plural solenoid valves to open and control a flow of a brake fluid from the brake pressure source to the wheel cylinder substantially at the beginning a control by the brake control unit.

According to another aspect of the present invention, there is a brake control system for a motor vehicle that comprises a pressure generation means for generating a pressure, a brake control means for increasing and decreasing a brake pressure in a wheel cylinder from the pressure generation means to drive plural solenoid valves, and a flow back control means for controlling a brake fluid in the wheel cylinder to drive the plural solenoid valves before starting operation of the brake control means and return the brake pressure to the pressure generation means from the wheel cylinder of the brake pressure in the wheel cylinder.

According to another aspect of the present invention, there is a method of a brake control for a motor vehicle based on an increase and a decrease of brake pressure in a wheel cylinder using plural solenoid valves without brake operation by driver, which comprises pumping a brake fluid to a wheel cylinder, controlling a flow back such that the brake fluid flows back from the wheel cylinder to the pump for driving plural solenoid valves, and then controlling increasing and decreasing of the brake pressure in the wheel cylinder after the flow back.

DETAILED DESCRIPTION OF THE INVENTION

Figure 1:
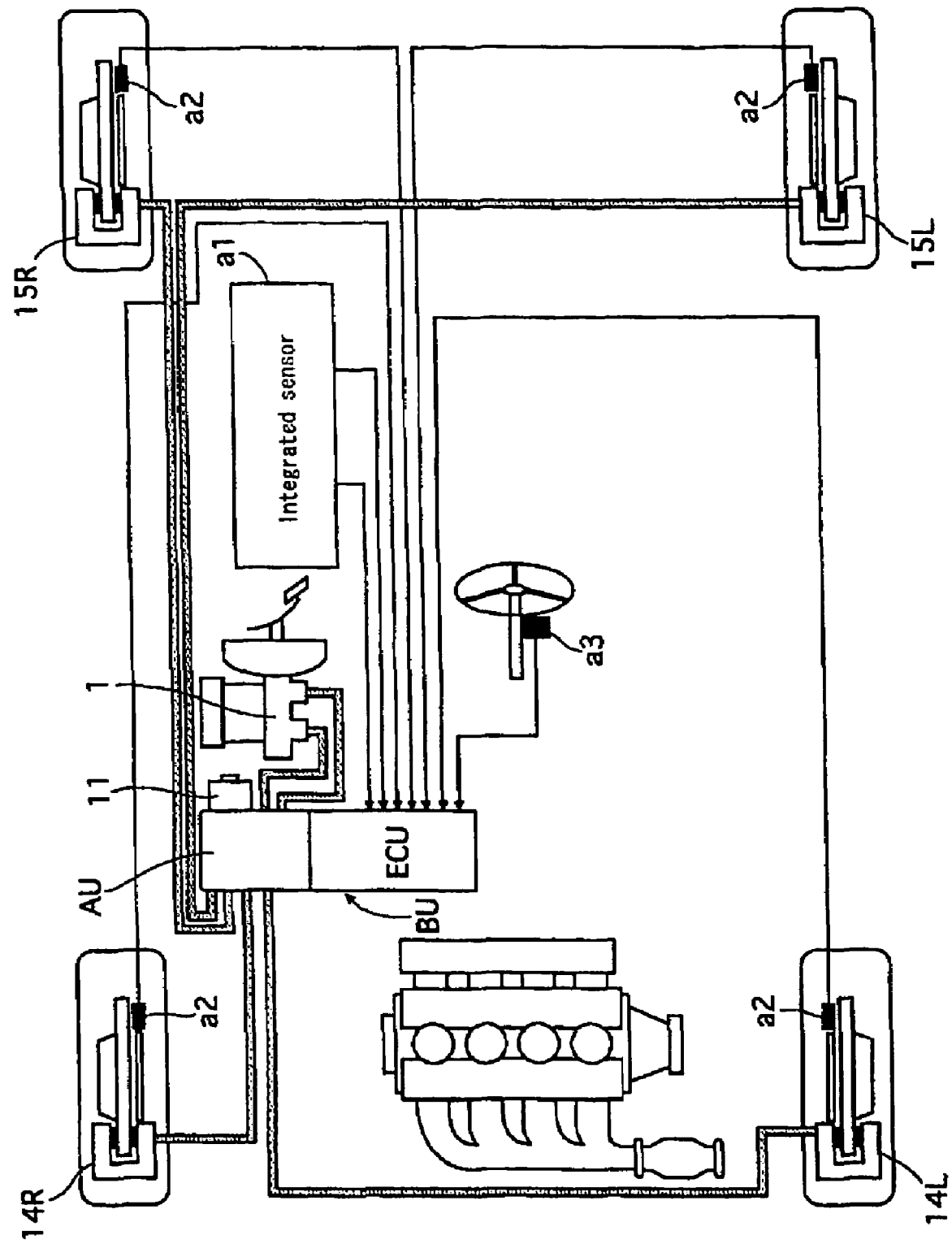
FIG. 1 shows a general view of a vehicle system providing a brake control system according to a first embodiment of the present invention.

Referring to the drawings, a description is made of embodiments of the present invention.

As seen in FIG. 1, a brake control system BU has a integrated sensor a1, comprising a yaw rate sensor, a lateral-G sensor and a longitudinal-G sensor, as well as a wheel speed sensor a2 and a steering angle sensor a3 for detection of a steering angle is changed by a driver. A pressure output from the brake system BU is provided to each wheel cylinder 14, 15 for obtaining a desired brake force.

A sensor amount detected by each kind of sensor (a1, a2, a3) is inputted to a control unit ECU that outputs a drive signal to an actuator unit AU as an actuator group that controls solenoid valves and a motor 11.

Figure 2:
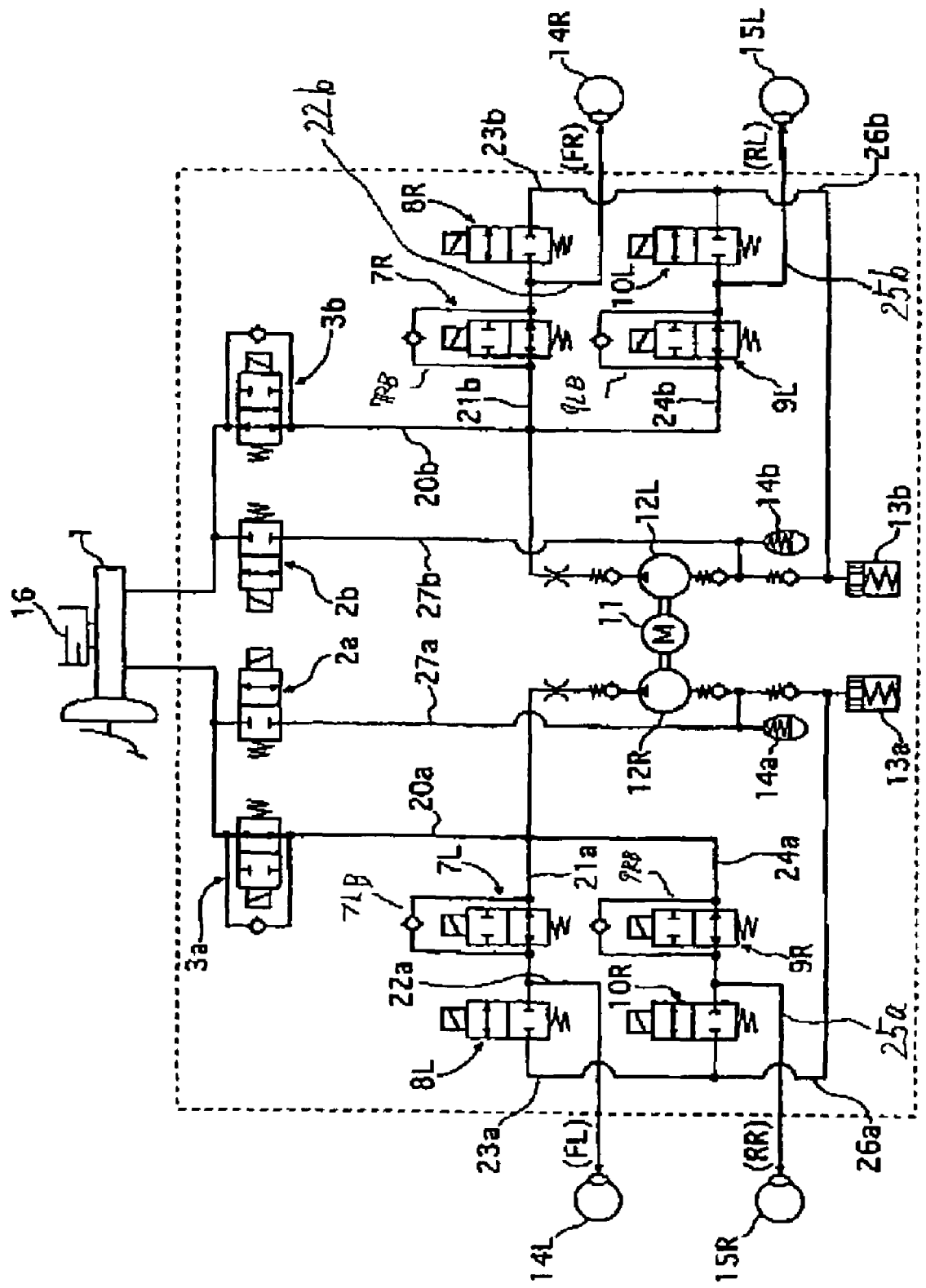
FIG. 2 shows a circuit of the brake control system according to the first embodiment of the present invention.

FIG. 2 shows a circuit of a brake control system that has a plurality of solenoid valves 2, 3, 7, 8, 9, 10, each initially being in an off condition. A master cylinder 1 (exactly, a tandem master cylinder) which is supplied by a reservoir tank 16, generates pressure and connects to both an A system path 20a and a B system path 20b. The fluid circuit A system and the fluid circuit B system have the same basic structure. Therefore, an explanation is given only of the A system because the fluid circuit B system acts similarly. The structure of each system is distinguished by using the letters a, b, the left and right side portions are distinguished by the letters L, R, and the front and rear positions are distinguished by the letters F, R.

The A system path 20a has an outside gate valve (an outflow gate valve) 3a, which is a normally open type, and a pump 12R pumping to an upstream portion of the A system path 20a, wherein a position of the master cylinder 1 defines an upstream location. The A system path 21a of a left front wheel group (FL) connects to a location between the outside gate valve 3a and the pump 12R. The A system path 24a of a right rear wheel group (RR) connects to a location between the outside gate valve 3a and the pump 12R.

A pump 12L which is similar to the pump 12R, is provided to the B system path 20b. Both pumps are driven by their common motor 11. A suction path 27a is provided to an inside gate valve (an inflow gate valve) 2a, which is a normally closed type, and a diaphragm 14a is provided to the inside gate valve 2a at a downstream location. Where the pumps 12L, 12R are piston pumps, the system can not provide a sufficient suction when the temperature is low. However, the diaphragms 14a, 14b, can provide smooth suction, based upon suction from the master cylinder 1 during a process of discharge, when the diaphragms 14a, 14b are disposed near the pumps.

A bypass path 7LB, which permits a flow upstream, is provided in order to avoid a pressure increase solenoid valve 7L. The pressure increase solenoid valve 7L increases or holds the pressure of a front left wheel cylinder 14L, which is used for front left wheel ABS and is a normally open type. A path 22a, which is split from the path 21a of a left front wheel group, connects to the wheel cylinder 14L. A first decrease path 23a, for decreasing the pressure of the wheel cylinder 14L, is connected to the path 21a downstream of the path 22a via a pressure decrease solenoid valve 8L. The pressure decrease solenoid valve 8L decreases pressure or holds the pressure of the wheel cylinder 14L, which is used for front wheel ABS and is a normally closed type, is provided between the first decrease path 23a and the path 22a.

A bypass path 9RB which permits a brake-fluid flow upstream is provided in order to avoid a pressure increase solenoid valve 9R. The pressure increase solenoid valve 9R increases or holds a pressure of a rear right wheel cylinder 15R, which is used for rear right wheel ABS and is a normally open type on the path 24a of a right rear wheel group. A path 25a, which is split from the path 24a, connects to the wheel cylinder 15R. A second decrease path 26a, for decreasing the pressure of the wheel cylinder 15R, is connected to the path 24a downstream of the path 25a via a pressure decrease solenoid valve 10R. The pressure decrease solenoid valve 10R decreases or holes the pressure of the wheel cylinder 15R, which is used for rear wheel ABS and is a normally closed type, and is provided between the second decrease path 26a and the path 25a. A reservoir 13a for ABS is provided to the second decrease path 26a. In a similar manner to the reservoir 13a of the A hydraulic-brake system, a reservoir 13b of the B hydraulic-brake system is also provided.

Comparable paths and solenoid valves are provided in the B system. A description is omitted because the difference is only the letters L, R or a, b.

When a master cylinder pressure is increased by operation by the driver, the path 20a and the path 20b are operated at the same pressure, the pressure being supplied to the paths 21a, 21b of the front wheel group and the paths 24a, 24b of the rear wheel group through the outside gate valves 3a, 3b. After that, a pressure of the front wheel cylinders 14L 14R is increased via the paths 22a, 22b through the pressure increase solenoid valves 7L, 7R. Also, a pressure of the rear wheel cylinders 15R, 15L is increased via the paths 25a, 25b through the pressure increase solenoid valves 9L, 9R.

When a depressing force on the pedal by the driver is insufficient, and an additional brake force is needed to ensure that a desired brake force, the inside gate valve 2a, 2b is opened and the outside gate valve 3a, 3b is closed in order to provide a brake assist. After that, the master cylinder pressure is estimated by the control unit ECU that calculates an appropriate amount of assist for braking, corresponding to the master cylinder pressure. The master cylinder pressure can be detected by a pressure sensor instead of being estimated. The brake fluid is supplied to each wheel cylinder from master cylinder 1 through suction paths 27a, 27b by driving the motor 11 to provide a desired amount of assist. In this way, the action of brake assist supplies the brake pressure to each wheel cylinder.

When a master cylinder pressure is decreased, the pressure of the front wheel cylinder 14L, 14R decreases, following the same path when a pressure increases. At that time, the pressure decrease can be achieved quickly by the bypass paths 7LB, 7RB and 9LB, 9RB, which are provided to the pressure increase solenoid valves 7L, 7R and 9L, 9R. In case of a pressure decrease during a brake assist, the pressure decrease can be achieved by decreasing driving amount of the motor, or by closing the inside gate valves 2a, 2b. When driver's pressing on the pedal is strong in normal braking, the wheels tend to lock, and ABS is operated. ABS can be achieved by open and close of the pressure increase solenoid valves 7L, 7R and 9R, 9L and the pressure decrease solenoid valves 8L, 8R and 10L, 10R.

"VDC" means a vehicle dynamics control system, which is used for vehicle stability control. In spite of a brake operation by the driver, when a loss of stability is detected by the steering angle by the driver, yaw rate, lateral-G and longitudinal-G, vehicle dynamics control (vehicle stability control) comes into operation. During the vehicle dynamics control (VDC) mode, the outside gate valves 3a, 3b are kept in their closed states.

After that, pumps 12L, 12R, acting as pressure sources, are driven by operation of the motor 11. The pumps 12L, 12R provide suction to the master cylinder 1 through the inside gate valves 2a, 2b, when at least one of valves 2a, 2b is opened. Then, the wheel cylinder pressure of a target system is estimated or is detected, and only the pressure of target wheel cylinder is increased for achieving stability with respect to yaw rate. In this embodiment, using the "A system" structure that comprises a front left wheel and rear right wheel, "B system" structure that comprises a front right wheel and rear left wheel, an X-type brake line system is achieved for controlling a brake force that can provide stable vehicle control.

In case a pressure of wheel cylinder of a target system is to be held, the pressure increase solenoid valves 7L, 7R or 9L, 9R of the target wheel of the target system are closed to hold wheel cylinder pressure. In case the wheel cylinder pressure of the target system is to be decreased, the outside gate, valves 3a, 3b are opened so that provides pressurized the brake fluid can flow to the master cylinder 1. Appropriate estimation of the wheel cylinder pressure can be provided by estimating a drive time of the pump and actuation time of the inside gate valves 2a, 2b and outside gate valves 3a, 3b.

In spite of a brake operation by the driver, when an acceleration slip of drive wheels is detected, traction control comes into operation. During the traction control system (TCS) operating mode, the outside gate valves 3a, 3b are kept in their closed states. Thereafter, pump 12L, 12R, acting as pressure sources, are driven by operating the motor 11. Pumps 12L, 12R provide suction to the master cylinder 1 through the inside gate valves 2a, 2b if they are opened. If the vehicle is a rear-wheel-drive-car, during the TCS operating mode, pressure increase solenoid valves 7L, 7R are kept closed, while pressure increase solenoid valves 9L, 9R are kept open. In this way, acceleration slip of the drive wheels (rear road wheel) can be suppressed by way of the increased rear wheel cylinder pressures.

In case a wheel cylinder of a target system is to be held, the inside gate valves 2a, 2b or the pressure increase solenoid valves 7L, 7R or the pressure increase solenoid valves 9L, 9R are closed to hold wheel cylinder pressure. In case the wheel cylinder pressure of the target system associated with at least one road wheel, subjected to control of the vehicle control system with hydraulic braking system interaction, is to be decreased, the outside gate valves 3a, 3b are opened so that the brake fluid can flow back to the master cylinder 1.

When a relative distance between the vehicle and an obstruction in front of the vehicle, as detected by a laser, is less than a predetermined value, adaptive cruise control for collision avoidance comes into operation for achieving a needed brake force, in a similar manner to a brake pressure increase operating mode executed during the TCS mode (TCS control) or during the VDC mode (VDC control). In such case, the same magnitude of braking force is applied to all wheels.

The following is an explanation of the improved pressurization management (pre-charge and flow back control) of the first embodiment of the present invention. In the first embodiment, the pressurization management at the beginning of VDC control was already explained. However the pressurization management can be carried out in some situations where wheel cylinder pressure is controlled without an operation of brake pedal by driver. In particular, when a clearance between the brake pad and brake rotor is not suitable for proper control, the pressurization management can be conducted. There may be other cases as well. The pressurization management can be carried out at or just a little bit before beginning of VDC and will not influence of the brake control extent. (i.e., substantially at the beginning of control by the brake control unit) For example, if the pressurization management is interrupted beginning of the brake control, the clearance between the brake rotor and the brake pad have to be activated to provide an adjustment as soon as possible.

Figure 3:
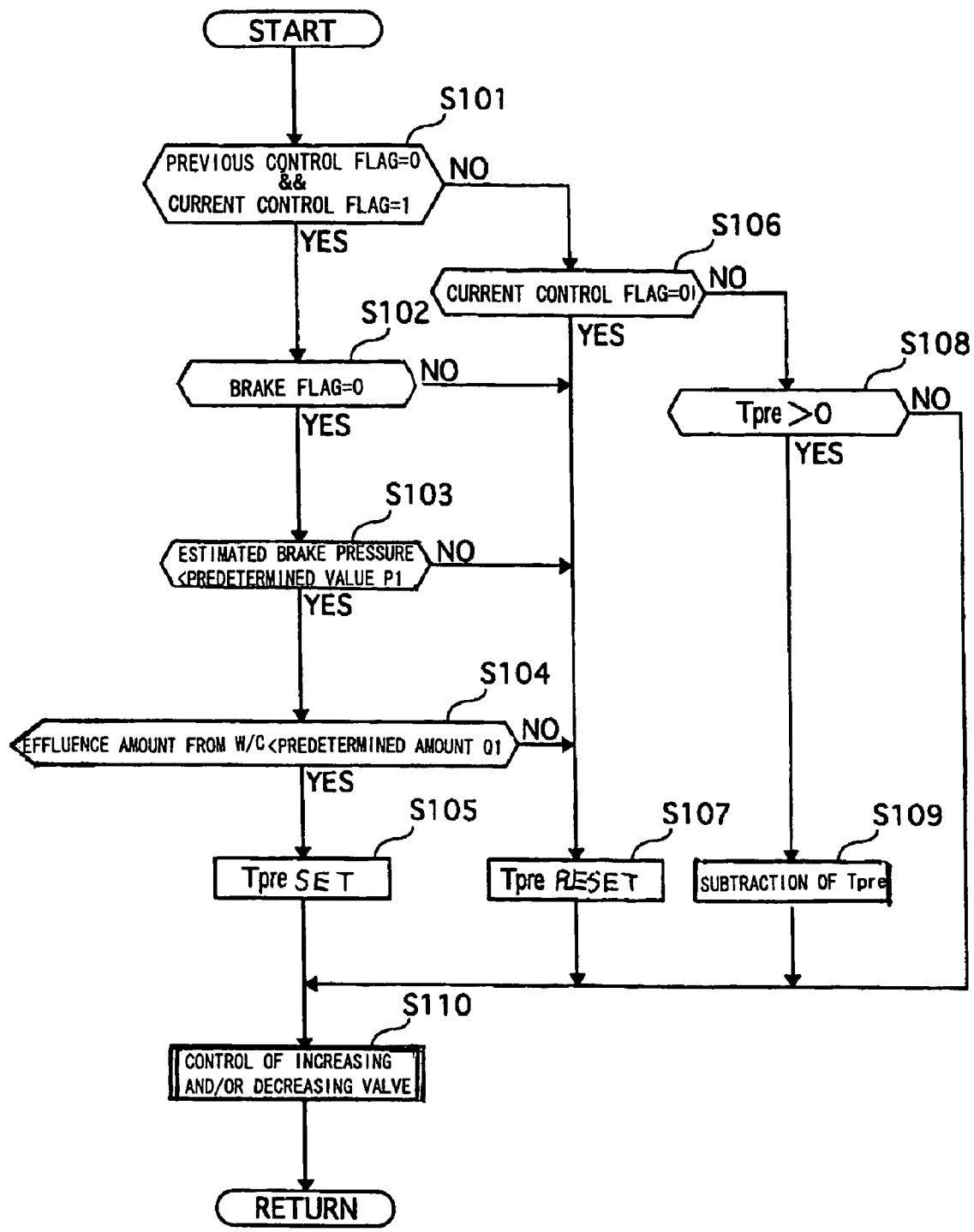
FIG. 3 shows a flowchart depicting pressurization according to the first embodiment of the present invention.

FIG. 3 shows a flowchart depicting the improved pressurization management (pre-charge and flow back control) according to the first embodiment of the present invention. At a step 101, it is determined whether or not a previous control flag is equal to 0 (a last time control's flag) and a current control flag is equal to 1. If it is determined that VDC control has begun, flow proceeds to a step 102. At all other times, flow proceeds to a step 106. Namely, in step 101 it determines a situation that a clearance between the brake pad and brake rotor can be problem, such as at a beginning of VDC control.

At step 102, it is determined whether or not a brake flag is equal to 0. If it is determined that the brake flag is equal to 0, at that time, the brake pedal is not operated, and flow proceeds to step 103. At all other times, flow proceeds to a step 107. If the brake pedal is operated, there is no clearance between the brake pad and brake rotor. Thus, at step 102, it is determined whether there is a situation where a clearance between the brake pad and brake rotor can be problem.

At a step 103, the wheel cylinder pressure of the target system associated with at least one road wheel, subjected to control of the vehicle control system with hydraulic braking system interaction, is estimated, and it is determined whether or not the estimated wheel cylinder pressure is under a predetermined value P1. When the estimated wheel cylinder pressure is less than the predetermined value P1, the routine proceeds to step 104. Conversely when the estimated wheel cylinder pressure is greater than or equal to the predetermined value P1, the routine proceeds to step 107. Predetermined value P1 is defined as a wheel cylinder pressure value that exists when there is no clearance. In other words, predetermined value P1 is a threshold pressure value that does not result in braking force application to the road wheel. A situation that there is no pad-to-rotor clearance is either a case when the brake pedal is depressed by driver or a case where the wheel cylinder pressure increase control has already been initiated. That is, a check of step 103 (that is, the comparative check between the estimated wheel cylinder pressure and predetermined value P1) is made to determine whether or not the pad-to-rotor clearance can be problem. For example, "no clearance" between the brake pad and the brake rotor is defined as a contact or slight but approximately equal separation between the brake pad and the brake rotor so that there is no influence on the extent the brake control. This includes a case where the pad-to-rotor clearance is not completely zero after a variation in pad-to-rotor clearance has been adjusted.

Assuming that vehicle dynamics control VDC has already been initiated one execution cycle before, the previously-discussed estimated wheel cylinder pressure may be computed or determined based on an operating time of each of pressure-increase and pressure-decrease solenoid valves (7L-8L, 9R-10R; 7R-8R,9L-10L) and/or a driving characteristic of pumps 12L, 12R (e.g., pump control gain or an actuating time) at the previous VDC execution cycle. In lieu thereof, the estimated wheel cylinder pressure may be computed or determined based on the yaw rate and/or the deceleration rate of the vehicle, detected during the previous VDC execution cycle. In the shown embodiment, the wheel cylinder pressure of the target system associated with at least one road wheel, subjected to control (e.g., VDC control) of the vehicle control system with hydraulic braking system interaction, is estimated as previously discussed. Alternatively, the wheel cylinder pressure of the target system may be detected directly by means of a wheel cylinder pressure sensor.

At a step 104, an outflow amount of brake fluid flowing out of the wheel-brake cylinder of the second road wheel (e.g., the VDC noncontrolled wheel), which is included in the same hydraulic-brake system as the first road wheel (e.g., the VDC controlled wheel), subjected to control of the vehicle control system with hydraulic braking system interaction, is estimated. Then, a check is made to determine whether the estimated outflow amount of brake fluid flowing out of the wheel-brake cylinder of the VDC noncontrolled wheel, unsubjected to vehicle dynamics control at the current VDC execution cycle, is less than a predetermined amount Q1. When the estimated outflow amount of brake fluid is less than the predetermined amount Q1, the routine proceeds to step 105. Conversely when the estimated outflow amount of brake fluid is greater than the predetermined amount Q1, the routine proceeds to step 107. Predetermined amount Q1 is defined as an outflow amount enough to adjust the pad-to-rotor clearance of the VDC controlled wheel, subjected to vehicle dynamics control at the current VDC execution cycle, to an approximately zero clearance by introducing the brake fluid, flown out of the wheel-brake cylinder of the second road wheel (the VDC noncontrolled wheel) before a predetermined number of execution cycles from the starting point of wheel cylinder pressure control for the first road wheel (the VDC controlled wheel at the current VDC execution cycle), into the wheel-brake cylinder of the first road wheel (the VDC controlled wheel at the current VDC execution cycle . For instance during lane-changing, suppose that the VDC controlled wheel momentarily switches from one of the road wheels included in the same hydraulic-brake system (either the A system or the B system) to the other. In such a case, the brake fluid flowing out of the wheel-brake cylinder of the one road wheel tends to flow into the wheel-brake cylinder of the other road wheel, corresponding to the VDC controlled wheel at the current VDC execution cycle. When the amount of brake fluid flowing into the wheel-brake cylinder of the VDC controlled wheel at the current VDC execution cycle is greater than or equal to the predetermined value Q1, the pad-to-rotor clearance of the VDC controlled wheel has already been adjusted to an approximately zero clearance and thus there is no necessity of execution of the pre-charge and flow-back operating mode. That is, in addition to the first check of step 103 (i.e., the comparative check between the estimated wheel cylinder pressure and predetermined value P1), a second check of step 104 (i.e., the comparative check between the estimated amount of outflow brake fluid and predetermined amount Q1 is also made to determine whether or not the pad-to-rotor clearance adjustment is insufficient.

At step 105, a pre-charge timer (a count-down timer) Tpre is set at a predetermined time (i.e., a pre-charge time duration corresponding to a set time of pre-charge timer Tpre). The predetermined time is set to provide a satisfactory pre-charging action enough to adjust the pad-to-rotor clearance of each individual road wheel, in particular, the VDC controlled wheel, subjected to VDC control, to an approximately zero clearance even when there are undesired fluctuations (positive and negative variations) in pad-to-rotor clearances of the road wheels.

At step 106, a check is made to determine whether the current control flag is equal to "0". When the answer to step 106 is affirmative (YES), the routine proceeds to step 107, since VDC control is unnecessary.

At step 107, the pre-charge timer Tpre is reset to 0.

At step 108, it is determined whether or not a counter of the pre-charge timer is higher than 0. If it is higher than 0, flow proceeds to step 109, where the pre-charge timer is subtracted. For example, the pre-charge timer defines a predetermined value based on various factors of a vehicle. On the other hand, if the pre-charge timer is less than or equal to 0, flow proceeds directly to step 110. The timer count value of pre-charge timer Tpre less than or equal to "0" means completion of the pre-charging action.

At step 110, the operations of the pressure control valves (solenoid valves), the outside gate valves (outflow gate valve 3a, 3b), the inside gate valves (inflow gate valves 2a, 2b), and pumps 12R, 12L are controlled according to the VDC control mode. Note that, when the timer count value of pre-charge timer Tpre is greater than "0", outside gate valves 3a, 3b are kept open. Generally. VDC control is initiated in a manner so as to build up the wheel cylinder pressure of the VDC controlled wheel. The wheel cylinder pressure build-up is achieved by closing outside gate valves 3a, 3b, while opening inside gate valves 2a, 2b, and operating pumps 12L, 12R. In contrast to the usual pressure build-up operating mode of VDC control, if the timer count value of pre-charge timer Tpre is still greater than "0" during the pre-charge and flow-back operating mode executed by the brake control apparatus of the first embodiment, outside gate valves 3a, 3b are kept open. During the pre-charge and flow-back operating mode executed, if necessary, for the pre-charge time duration corresponding to a set time of pre-charge timer Tpre, before execution of brake control (e.g., VDC control) that the return pumps 12L, 12R serve as a pressure source while using master cylinder 1 as a brake fluid source or during the initial stage of the brake control (e.g., VDC control), inside gate valves 2a, 2b, kept open, contribute to the pre-charging action for adjustment of the pad-to-rotor clearance of each individual road wheel (in particular, the VDC controlled wheel subjected to VDC control) to an approximately zero clearance. On the other hand, outside gate valves 3a, 3b, kept open, contribute to the flowing-back action of brake fluid from each of the individual wheel cylinders back to the master cylinder for avoidance of brake-fluid oversupply to each wheel cylinder.

Figure 4:
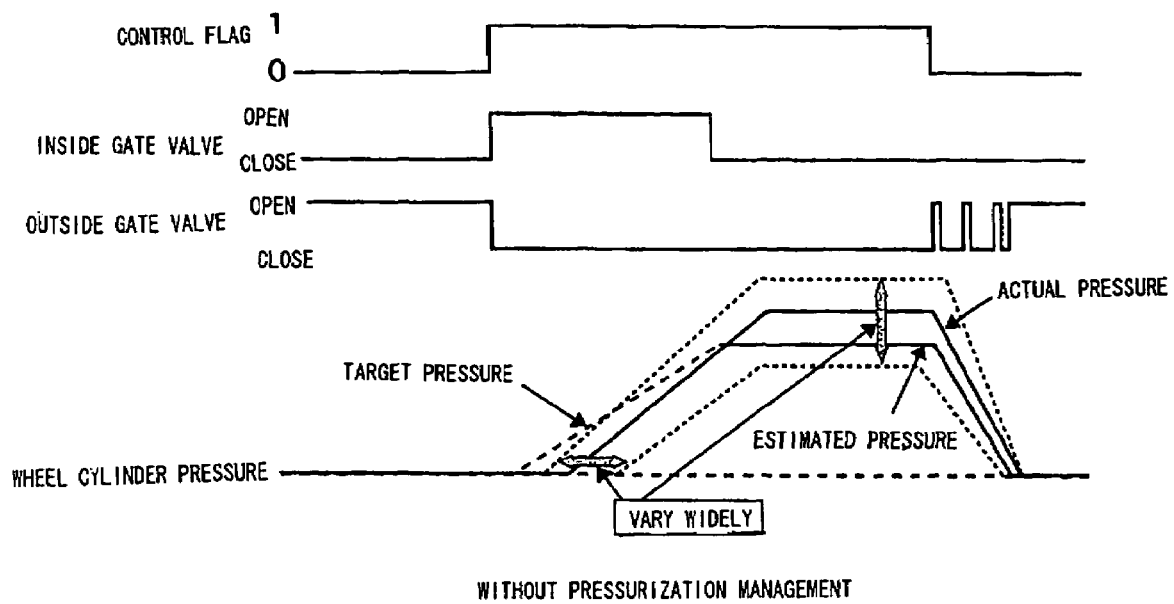
FIG. 4 shows a time chart depicting a changing of a wheel cylinder pressure when a VDC is controlled, according to a related art of the present invention.
Figure 5:
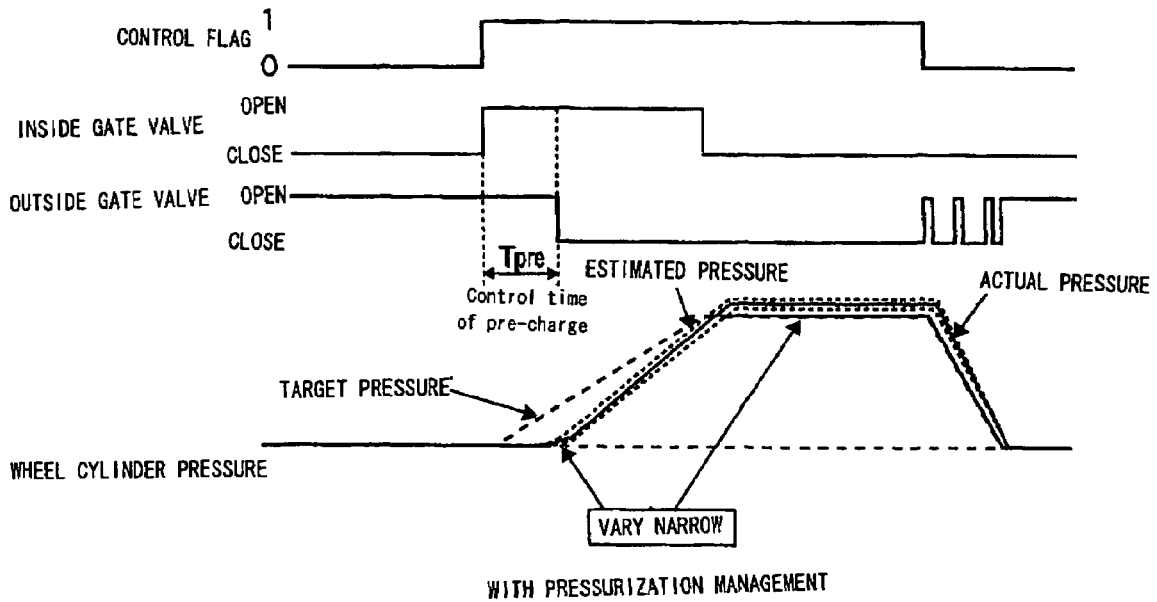
FIG. 5 shows a time chart depicting a changing of a wheel cylinder pressure when a VDC is controlled, according to the first embodiment of the present invention.

Next, the pre-charge and flow-back operating mode, executed by the brake control apparatus of the first embodiment, is hereunder described in detail. FIG. 4 shows a time chart depicting variations in the control flag, inside gate valves 2a, 2b, outside gate valves 3a, 3b, and the wheel cylinder pressure of the VDC controlled wheel subjected to VDC control, obtained by the conventional VDC control with no pre-charging action. FIG. 5 shows a time chart depicting variations in the control flag, inside gate valves 2a, 2b, outside gate valves 3a, 3b, and the wheel cylinder pressure of the VDC controlled wheel subjected to VDC control, obtained by the brake control apparatus of the first embodiment configured to execute the improved VDC control with the pre-charge and flow-back operating mode.

In the case of the conventional VDC control shown in FIG. 4, immediately when the control flag becomes set to "1", the wheel cylinder pressure of the VDC controlled wheel is increased by operating pumps 12L, 12R, while keeping inside gate valves 2a, 2b open and simultaneously keeping outside gate valves 3a, 3b closed. At that time, if there are undesired variations or fluctuations in pad-to-rotor clearances of the road wheels, the VDC control cannot be executed accurately. This is because a point of time when the wheel cylinder pressure of the VDC controlled wheel begins to rise tends to considerably vary or fluctuate for each individual wheel-brake cylinder, and a remarkable deviation of the actual wheel cylinder pressure of the VDC controlled wheel from the target pressure tends to occur at the middle stage of the pressure build-up mode, owing to the undesired fluctuation in the timing of a wheel cylinder pressure rise of the VDC controlled wheel. Additionally, owing to the undesired fluctuation in wheel-cylinder-pressure-rise timing, operating times of pressure-increase and pressure-decrease solenoid valves (7L-8L, 9R-10R; 7R-8R, 9L-10L) and/or a driving characteristic of pumps 12L, 12R (e.g., a gain or an actuating time) tend to deviate from their desired operating times, and thus the estimated wheel cylinder pressure of the VDC controlled wheel, computed based on the valve operating time and/or the pump actuating time, also tends to undesirably vary.

In contrast to the above, in the case of the brake control apparatus of the first embodiment configured to execute the improved VDC control with the pre-charge and flow-back operating mode shown in FIG. 5, immediately when the control flag becomes set to "1", inside gate valves 2a, 2b are kept open, whereas outside gate valves 3a, 3b are kept open for the pre-charge time duration corresponding to the set time of pre-charge timer Tpre, which is set at the switching point of the control flag from "0" to "1". Under these conditions, when pumps 12L, 12R are driven, the pre-charging action is initiated in such a manner as to permit brake fluid flow through a brake-fluid path from master cylinder 1 (serving as a brake fluid source) to each of the individual wheel-brake cylinders (14L, 15R; 14R, 15L) via inside gate valves 2a, 2b, a second hydraulic circuit (27a,21a,24a; 27b,21b,24b), pumps 12R, 12L, and the pressure control valves (i.e., pressure-increase solenoid valves (7L,9R; 7R,9L) opened). At the same time, the flowing-back action is initiated in such a manner as to permit brake fluid flow through a brake-fluid path from each of the individual wheel-brake cylinders (14L,15R; 14R,15L) back to master cylinder 1 via the pressure control valves (i.e., pressure-increase solenoid valves (7L,9R; 7R,9L) opened or pressure-increase and pressure-decrease solenoid valves (7L-8L,9R-10R; 7R-8R, 9L-10L) all opened), a first hydraulic circuit (21a,24a,20a; 21b,24b,20b), and outside gate valves 3a, 3b. By the synergistic effect of the pre-charging action and the flowing-back action according to the brake control apparatus of the applicant's invention, even when a large amount of brake fluid is supplied to each of the individual wheel-brake cylinders during the pre-charge and flow-back operating mode, it is possible to avoid an improper rise in wheel cylinder pressure by virtue of outside gate valves 3a, 3b kept open. Thus, high pressure does not occur inside of the brake pressure circuit.

As appreciated from the above, an infinitesimal amount of pressure occurs to such an extent that the infinitesimal pressure overcomes the resistance of each of the solenoid valves and the resistance of each of the brake-fluid paths. Therefore, even when there are undesired fluctuations in pad-to-rotor clearances of the road wheels, a suitable amount of brake fluid can be supplied to the wheel-brake cylinder of the VDC controlled wheel by the infinitesimal pressure during the pre-charge and flow-back operating mode executed at the initial stage of VDC control. Even when brake-fluid oversupply to the wheel-brake cylinder of the VDC controlled wheel occurs after the pad-to-rotor clearance of the VDC controlled wheel has already been adjusted to an approximately zero during the pre-charge and flow-back operating mode, it is possible to flow the brake fluid from each individual wheel-brake cylinder back to master cylinder 1 by the flowing-back action, thus avoiding a braking force from being applied to the VDC controlled wheel at an undesirable timing. In the first embodiment, the pre-charge and flow-back operating mode is executed for the pre-charge time duration at the initial stage of VDC control, it will be appreciated that the invention is not limited to the particular embodiment shown and described herein but that various modifications may be made. For instance, the timing of execution of the pre-charge and flow-back operating mode may be executed for the pre-charge time duration just before VDC control. Executing the pre-charge and flow-back operating mode just before the VDC control can provide the same effects as the first embodiment.

Immediately when the set time of pre-charge timer Tpre has expired, outside gate valves 3a, 3b are switched to their closed positions. Thereafter, the operating mode of the brake control system of the first embodiment switches from the pre-charge and flow-back operating mode to the usual VDC control mode. The wheel cylinder pressure of the VDC controlled wheel subjected to VDC control can be accurately estimated substantially at the aforementioned switching point, and thus there is a less fluctuation in wheel-cylinder-pressure-rise timing, and additionally there is a less deviation of the actual wheel cylinder pressure of the VDC controlled wheel from the target pressure at the middle stage of the pressure build-up mode (see FIG. 5).

As discussed above, note that, according to the brake control apparatus of the first embodiment, outside gate valves 3a, 3b as well as inside gate valves 2a, 2b are kept open when executing the pre-charge and flow-back operating mode if necessary, and thus it is possible to avoid brake fluid from being oversupplied to the wheel-brake cylinder of the VDC controlled wheel by virtue of the flowing-back action after the and pad-to-rotor clearance of the VDC controlled wheel has already been adjusted to an approximately zero as a result of the pre-charging action on the assumption that an amount of brake-fluid supply to the wheel-brake cylinder of the VDC controlled wheel is set to a comparatively large value. This ensures a reliable and high-precision pad-to-rotor clearance management, thus enabling a wheel-cylinder-pressure rise of the VDC controlled wheel at the desired timing. That is, there is a strong correlation between the pump driving characteristic (a pump control gain or an actuating time of the pump) and the time rate of change in the actual wheel cylinder pressure in the VDC controlled wheel (or the actual wheel cylinder pressure of the VDC controlled wheel). Consequently, it is possible to remarkably enhance and improve the accuracy in wheel cylinder pressure control.

However, there is a demerit that a wheel cylinder pressure rise of the VDC controlled wheel does not occur until the set time of pre-charge timer Tpre expires, thereby somewhat deteriorating the VDC control responsiveness. Therefore, according to the brake control apparatus of the first embodiment, the brake control system is configured to execute the pre-charge and flow-back operating mode, only when needed, while estimating the pad-to-rotor clearance of the VDC controlled wheel by way of both of the first comparative check of step 103 and the second comparative check of step 104. As a whole, this enhances the control responsiveness. In lieu thereof, the control responsiveness may be enhanced or improved by setting a wheel cylinder pressure build-up gain of VDC control to a high value.

Figure 6:
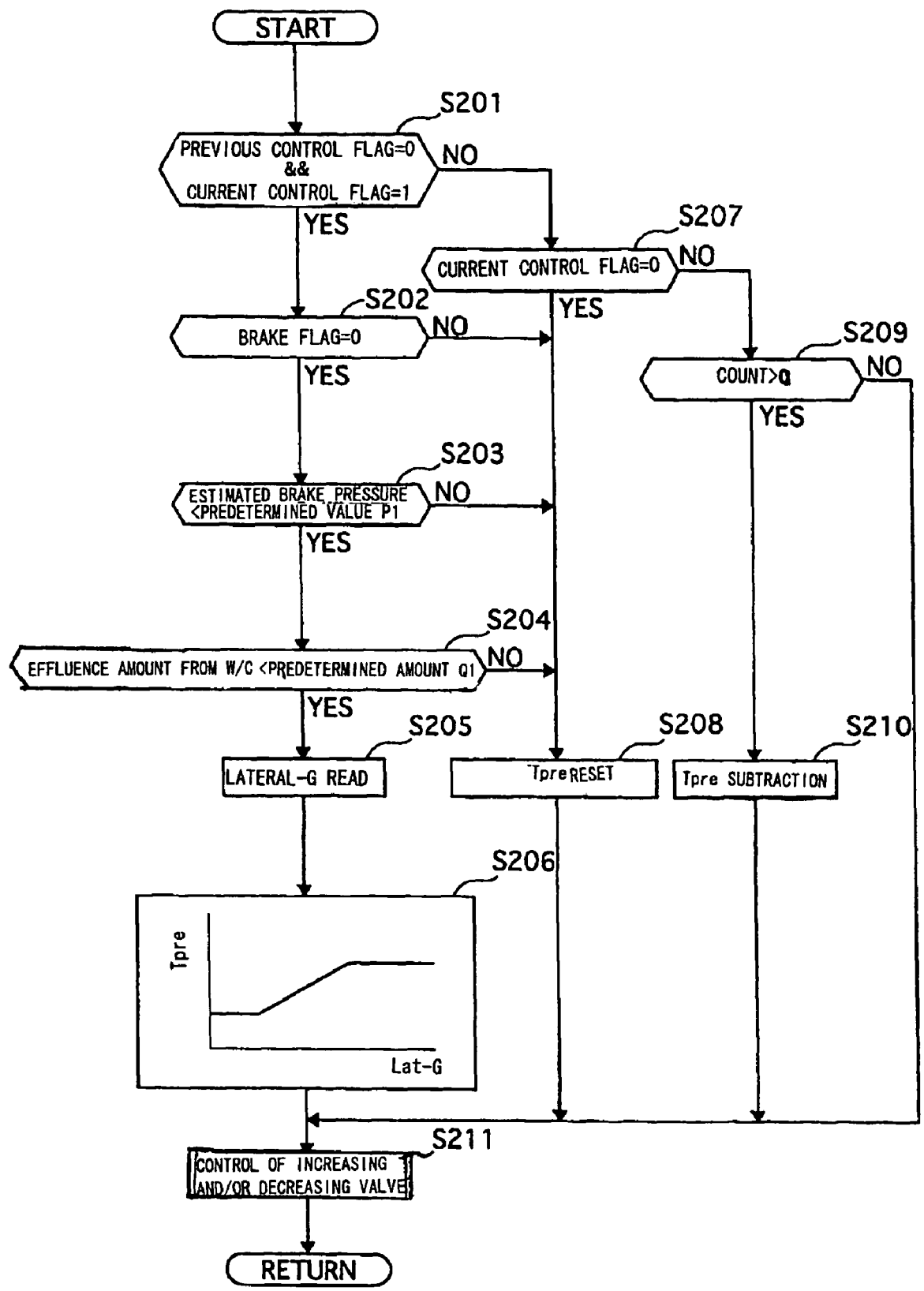
FIG. 6 shows a flowchart depicting pressurization according to a second embodiment of the present invention.

A second embodiment of the present invention will be described. To the existent that it has parts and portions similar to those of the first embodiment, they will be designated by like reference characters and will be described only the different structures, and operations will be described. FIG. 6 shows a flowchart depicting the improved pressurization management (pre-charge and flow-back control) according to the second embodiment of the present invention. Step 101 to step 104 of the first embodiment correspond to step 201 to step 204, and step 106 to step 110 of the first embodiment correspond to step 207 to 211.

At step 205, a lateral-G is read. At step 206, the pre-charge time duration corresponding to the set time of pre-charge timer Tpre is computed or determined based on the magnitude of the lateral-G exerted on the vehicle. It is useful to further consider the effect of the lateral-G during cornering of the vehicle. This is because the lateral-G also acts on the brake pad. Concretely, during the vehicle cornering, the brake pad of the outer road wheel tends to move away from the associated brake rotor. Thus, an increase of the pad-to-rotor clearance takes place due to the lateral-G. Even though the brake pad and the brake rotor are both fixed to a steering knuckle, the brake rotor tends to be slightly distorted by a cornering force acting on a tire during cornering, thereby causing a further increase in the pad-to-rotor clearance.

When the lateral-G is large, a long time is set for the pre-charge timer Tpre. On the other hand, when the lateral-G is small, a shorter time is set. The pre-charge time can be set to depend on various driving conditions.

In the second embodiment, the set time of pre-charge timer Tpre is determined based on a lateral-G detected by the lateral-G sensor. In lieu thereof, the set time of pre-charge timer Tpre may be determined as a variable based on a yaw rate detected by the yaw-rate sensor or as a variable based on a yaw rate and/or a lateral-G, estimated by a vehicle speed calculated based on wheel speeds detected by the wheel speed sensors and a steering angle detected by the steering angle sensor.

The invention is not limited to the embodiments described above. For example, if both the pressure increase solenoid valves 7L, 7R, 9L, 9R and the pressure decrease valves 8L, 8R, 10L, 10R are open, the clearance can be managed by flowing the brake fluid through the reservoirs 13a, 13b by operation of the pumps 12L, 12R. The pumps 12L, 12R can be driven while all valves are open for the improved pressurization management (pre-charge and flow-back control).

The entire contents of Japanese Patent Application P2004-258868 filed Sep. 6, 2004 is incorporated herein by reference.

What is claimed is:

1. A brake control apparatus for a motor vehicle comprising:
    a master cylinder connected via a first hydraulic circuit to a plurality of wheel cylinders, and configured to generate a master cylinder pressure by a driver's braking action;
    a plurality of pressure control valves disposed in the first hydraulic circuit for regulating a wheel cylinder pressure of each of the wheel cylinders;

a pump having a pump inlet connected via a second hydraulic circuit to the master cylinder and connected via a return circuit to each of the wheel cylinders, and a pump outlet connected via the first hydraulic circuit to each of the wheel cylinders, and configured to generate a hydraulic pressure independently of a driver's braking action;

an outflow gate valve disposed in the first hydraulic circuit;

an inflow gate valve disposed in the second hydraulic circuit; and a brake control unit configured to be electronically connected to the pressure control valves, the oufflow and inflow gate valves, and the pump, for regulating the wheel cylinder pressure of each of the wheel cylinders by controlling operations of the respective valves and the pump, wherein the brake control unit is configured to execute a pre-charge and flow-back operating mode in which the pump is operated for a pre-charge time duration, before execution of brake control that the pump is operated as a pressure source, or during an initial stage of the brake control, in a specified state where the outflow gate valve, the inflow gate valve, and the pressure control valves are kept open concurrently.

2. The brake control apparatus as claimed in claim 1, wherein:

the inflow gate valve is disposed between the master cylinder and the pump and located upstream of the second hydraulic circuit, for enabling pre-charging of brake fluid through a fluid flow path that permits brake fluid flow from the master cylinder to each of the wheel cylinders via the inflow gate valve, the second hydraulic circuit, the pump, and the pressure control valves; and the outflow gate valve is disposed between the master cylinder and the pressure control valves and located upstream of the first hydraulic circuit, for enabling flowing-back of brake fluid through a fluid flow path that permits brake fluid flow from each of the wheel cylinders back to the master cylinder via the pressure control valves, the first hydrauric circuit, and the outflow gate valve, simultaneously with the pre-charging action.

3. The brake control apparatus as claimed in claim 1, wherein:

the inflow gate valve comprises a normally-closed solenoid valve configured to open under its energized state for permitting brake fluid flow from the master cylinder via the second hydraulic circuit to the pump inlet; and the outflow gate valve comprises a normally-open solenoid valve configured to open under its de-energized state for permitting brake fluid flow from the master cylinder via the first hydraulic circuit to each of the wheel cylinders.

4. The brake control apparatus as claimed in claim 1, wherein:

the brake control unit is configured to determine, based on a comparative check between the wheel cylinder pressure of a road wheel subjected to the brake control and a predetermined pressure value, whether the pre-charge and flow-back operating mode should be executed.

5. The brake control apparatus as claimed in claim 4, wherein:

the brake control unit is configured to estimate, based on at least one of an operating time of each of the pressure control valves and a driving characteristic of the pump, the wheel cylinder pressure of the mad wheel subjected to the brake control1 and inhibit the pre-charge and flow-back operating mode when the estimated wheel cylinder pressure is greater than or equal to the predetermined pressure value.

6. The brake control apparatus as claimed in claim 4, wherein:

the brake control unit is configured to detect the wheel cylinder pressure of the road wheel subjected to the brake control, and inhibit the pre-charge and flow-back operating mode when the detected wheel cylinder pressure is greater than or equal to the predetermined pressure value.

7. The brake control apparatus as claimed in claim 4, wherein:

the predetermined pressure value is defined as a wheel-cylinder-pressure threshold value that is identified when a pad-to-rotor clearance of the road wheel subjected to the brake control has been adjusted to a substantially zero clearance.

8. The brake control apparatus as claimed in claim 4, wherein:

the master cylinder comprises a tandem master cylinder;

the motor vehicle employs an X-split brake line system in which a first outlet part of the tandem master cylinder is connected via an A-system brake line to the front-left and rear-right wheel cylinders and the second tandem-master-cylinder outlet part is connected via a B-system brake line to the front-right and rear-left wheel cylinders; and the brake control unit is configured to determine, based on a comparative check between an outflow amount of brake fluid flowing out of a noncontrolled wheel cylinder, unsubjected to the brake control at a current brake-control execution cycle and included in the same system brake line as a controlled wheel cylinder subjected to the brake control at the current execution cycle, and a predetermined amount, whether the pre-charge and flow-back operating mode should be executed.

9. The brake control apparatus as claimed in claim 8, wherein:

the brake control unit is configured to estimate, based on an amount of brake fluid flown out of the noncontrolled wheel cylinder before a predetermined number of execution cycles, the outflow amount of the noncontrolled wheel cylinder, and inhibit the pre-charge and flow-back operating mode when the estimated outflow amount is greater than or equal to the predetemiined amount.

10. The brake control apparatus as claimed in claim 8, wherein:

the predetermined amount is defined as an outflow amount enough to adjust a pad-to-rotor clearance of the road wheel subjected to the brake control to a substantially zero clearance by introducing brake fluid, flown out of the noncontrolled wheel cylinder before the predetermined number of execution cycles, into the controlled wheel cylinder subjected to the brake control at the current execution cycle.

11. The brake control apparatus as claimed in claim 1, wherein: the pre-charge time duration is fixed to a time duration.

12. The brake control apparatus as claimed in claim 1, wherein:

the pre-charge time duration is a variable determined based on a factor indicative of a dynamic behavior of the vehicle, including at least one of a yaw rate of the vehicle and a lateral acceleration exerted on the vehicle.

13. The brake control apparatus as claimed in claim 12, wherein:

the pre-charge time duration becomes longer, as the yaw rate increases.

14. The brake control apparatus as claimed in claim 12, wherein:
the pre-charge time duration becomes longer, as the lateral acceleration increases.

15. The brake control apparatus as claimed in claim 1, wherein:
only pressure-increase valves of the pressure control valves are kept open during the pre-charge and flow-back operating mode,

16. The brake control apparatus as claimed in claim 1, wherein:
pressure-increase and pressure-decrease valves of the pressure control valves are all kept open during the pre-charge and flow-back operating mode.

17. A brake control apparatus for a motor vehicle comprising:
first pressure source means connected via a first hydraulic circuit to a plurality of wheel cylinders, for outputting a hydraulic pressure produced by a drivers braking action to each of the wheel cylinders;
pressure control valve means disposed in the first hydraulic circuit for regulating a wheel cylinder pressure of each of the wheel cylinders, said pressure control valve means comprising pressure-increase and pressure-decrease valves;
second pressure source means having an inlet port connected via a second hydraulic circuit to the first pressure source means and connected via a return circuit to each of the wheel cylinders, and an outlet port connected via the first hydraulic circuit to each of the wheel cylinders, for generating a hydraulic pressure independently of a drivers braking action;
outflow gate valve means disposed in the first hydraulic circuit for controlling fluid communication between the first pressure source means and the pressure control valve means;
inflow gate valve means disposed in the second hydraulic circuit for controlling fluid communication between the first pressure source means and the second pressure source means; and
brake control means configured to be electronically connected to the pressure control valve means, the outflow and inflow gate valve means, and the second pressure source means, for regulating the wheel cylinder pressure of each of the wheel cylinders by controlling operations of the respective valve means and the second pressure source means, wherein
the brake control means is configured to execute a pre-charge and flow-back operating mode in which the second pressure source means is operated for a pre-charge time duration, before execution of brake control that the second pressure source means is operated as a pressure source, or during an initial stage of the brake control, in a specified state where the outflow gate valve means, the inflow gate valve means, and the pressure-increase valves of the pressure control valve means are kept open concurrently.

18. A method of brake control for a motor vehicle employing a master cylinder connected via a first hydraulic circuit to a plurality of wheel cylinders, a plurality of pressure control valves disposed in the first hydraulic circuit, a pump having a pump inlet connected via a second hydraulic circuit to the master cylinder and connected via a return circuit to each of the wheel cylinders and a pump outlet connected via the first hydraulic circuit to each of the wheel cylinders for generating a hydraulic pressure independently of a driver's braking action, an outflow gate valve disposed in the first hydraulic circuit, an inflow gate valve disposed in the second hydraulic circuit, and a brake control unit provided to regulate the wheel cylinder pressure of each of the wheel cylinders by controlling operations of the respective valves and the pump, the method comprising:
pre-charging brake fluid through a fluid flow path that permits brake fluid flow from the master cylinder to each of the wheel cylinders via the inflow gate valve, the second hydraulic circuit, the pump, and the pressure control valves, with the inflow gate valve kept open during a pre-charge and flow-back operating mode in which the pump is operated for a pre-charge time duration, before execution of brake control that the pump is operated as a pressure source, or during an initial stage of the brake control, in a specified state where the outflow gate valve, the inflow gate valve, and the pressure control valves are kept open concurrently; and
flowing-back brake fluid through a fluid flow path that permits brake fluid flow from each of the wheel cylinders back to the master cylinder via the pressure control valves, the first hydraulic circuit, and the outflow gate valve, with the outflow gate valve kept open during the pre-charge and flow-back operating mode, simultaneously with the pre-charging action.

* * * * *